T. P. SHAFFNER.

Blasting by Electricity

No. 51,674.

2 Sheets—Sheet 1.

Patented Dec. 19, 1865

Witnesses.
Edward H. Knight
Charles D. Smith

Inventor.
Tal. P. Shaffner

T. P. SHAFFNER.
Blasting by Electricity.
No. 51,674.
2 Sheets—Sheet 2.
Patented Dec. 19, 1865.
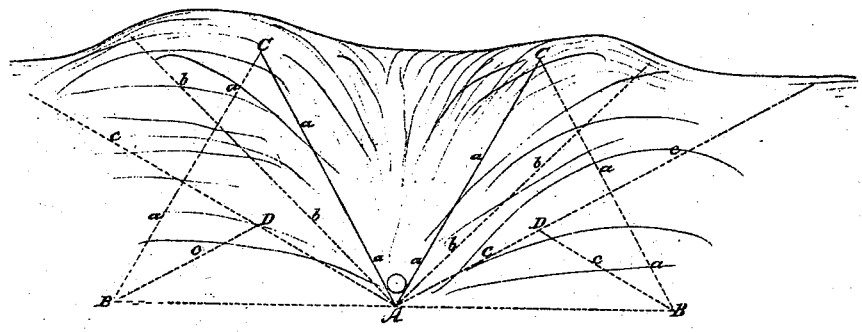
Fig. 6.
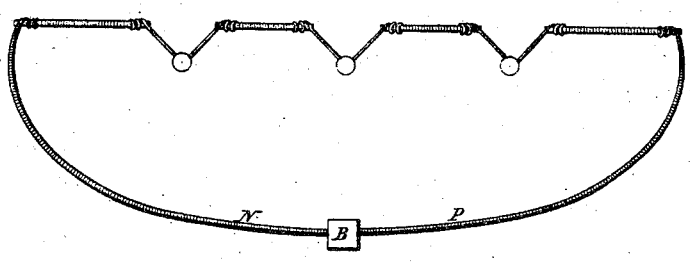
Fig. 7.
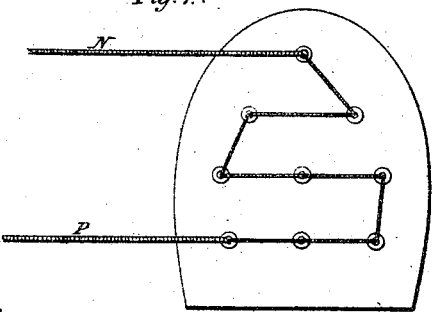
Witnesses
Edward H. Knight
Charles D. Smith
Inventor.
Tal. P. Shaffner

UNITED STATES PATENT OFFICE.

T. P. SHAFFNER, OF LOUISVILLE, KENTUCKY.

IMPROVEMENT IN BLASTING BY ELECTRICITY.

Specification forming part of Letters Patent No. 51,674, dated December 19, 1865.

*To all whom it may concern:*

Be it known that I, TALIAFERRO P. SHAFFNER, of Louisville, in the county of Jefferson and State of Kentucky, have made new and useful Improvements in Artillery Mining and Blasting; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1:
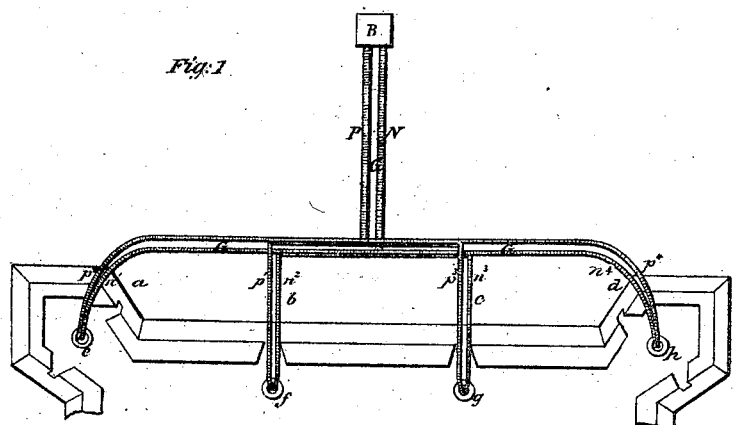
Figure 2:
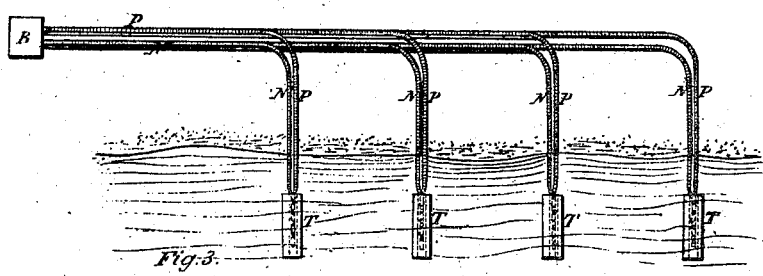
Figure 3:
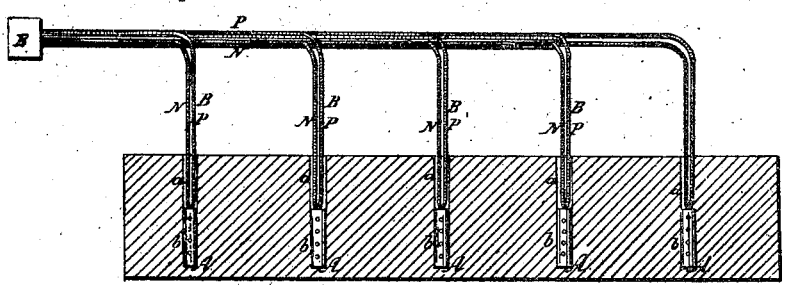
Figure 4:
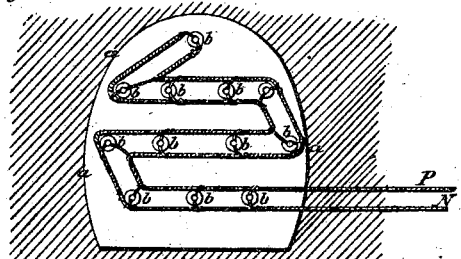

Figure 1 is a plan of a fort with the galleries, mines, and battery-wires, illustrating its application to blowing up the salient angles, &c., of the fort. Fig. 2 is an illustration showing the application of my improvement to the simultaneous explosion of torpedoes suitably placed. Fig. 3 is an illustration showing the application of my improvement to the purpose of blasting rock or demolition of walls, &c. Fig. 4 represents the heading of a tunnel with my improvement applied. Fig. 5 represents the cone of force in rock or water. Figs. 6 and 7 represent the heretofore-known mode of exploding two or more charges by the same electric current, and the former is shown as applied to a consecutive series of blasts in line, and the latter to the heading of a tunnel.

My invention consists in connecting a number of mines, torpedoes, or other objects with a battery, by means of branch wires of lesser conductivity than the main wires, or of placing on the branch circuits points of such resistance that each object as above shall, notwithstanding its different distance from the battery, receive a current of equal electric force.

The object is to obtain the simultaneous explosion of a number of mines, torpedoes, &c.; and it may be obtained by making the branch circuit-wires of smaller diameter than the main wires, so that their individual conductivity shall be less than the main wire. They may be so proportioned that their aggregate conductivity may be equal to that of the main wire, or each object, a mine for instance, may have interposed between the terminals of its fuse such a compound as to offer a resistance to the flow of the electric current sufficient to place each object under equal conditions as to electric influence, notwithstanding their different distances from the battery. This compound may consist of subsulphide of copper, subphosphide of copper, chlorate of potassium, carbon, and sulphur, or any equivalent compound, and its conductivity may be graduated by the addition of other elements to suit the designated purpose.

In Fig. 1, $a\ b\ c\ d$ are the salient angles, &c., of a fort, under which are the mines $e\ f\ g\ h$, respectively. The mines are approached by galleries G, and the battery by which they are to be exploded is seen at B.

P is the main positive wire and N the main negative wire. These have branch circuit-wires, $p'\ p^2\ p^3\ p^4$ and $n'\ n^2\ n^3\ n^4$, which connect the main wires with the mines. The wires as arranged in the figures contemplate the explosion of the whole at once.

In Fig. 2, which illustrates the invention as applied to torpedoes in rivers or harbors, the positive and negative main and branch wires are indicated by the same letters, and the general description of Fig. 1 applies to this figure, differing only in the character, position, and surroundings of the charges, torpedoes being substituted for mines.

In Fig. 3, which illustrates the invention as applied to blasting rock, the arrangement of wires is similar to Nos. 1 and 2. A A are the drill-holes, into which the branch circuit-wires are conducted, and $b$ are the charges, containing the fuse therein. $a\ a$ are the tamping above the charge.

In Fig. 4 is represented the heading of a tunnel, in which $b\ b\ b$, &c., represent the drill-holes charged for blasting, in each of which one branch circuit is led to fuses located in the charge, the said branch circuit-wires being connected to the main lines leading to the battery. The simultaneous explosion of all these blasts will secure their co-operation in the removal of the rock, leaving a comparatively even surface on a line near the bottom of the drill-holes. If blasted separately, the force will discharge the stone as a cone. (See Fig. 5.) Again, when the blasts are arranged to be simultaneously discharged, a less number of drill-holes will be required (probably a reduction of one-fifth) to obtain a given lineal progress.

In the diagram, Fig. 5, by the present known mode of blasting, the cone of force will be A C C, or by the lines *a a*. The increased effect by the instantaneous explosion of the charge is represented by A *b b*, but when exploded co-operatively, as illustrated by Fig. 3, the cone of force will be A *c c*. Now, supposing charges at A B B to be exploded simultaneously, the additional amount of disrupted rock by the explosion on the line *c c* will be represented by A C B D A. Usually, however, when the drill-holes are sufficiently numerous the rock is lifted nearly on the plane B A B.

In Fig. 6 the formerly-known method of connecting two or more charges to be exploded in one circuit is shown. By this process but a few charges can be exploded approximately near the same time, and in many instances the whole may fail to ignite, as the success will depend upon the efficiency of the charge containing the greatest resistance, while, on the other hand, by my invention, as represented by Figs. 1 2 3, the success does not depend upon the perfection of the arrangement of any one fuse or fuses.

Fig. 7 represents the system as applied to the heading of a tunnel under the arrangement of wires shown in Fig. 6, while Fig. 4 shows the arrangement of positive and negative main wires with a branch circuit, as in Figs. 1, 2, 3.

Having described my invention, what I claim as new, and desire to secure by Letters Patent, is—

The combination of the main circuit and the branch circuits, the latter being conducted to the various points for simultaneous ignition, and being of less conductivity than the main wires by reason of smaller size, or by the interposition of resistance between their terminals sufficient to place the different objects under equally favorable conditions for simultaneous explosion, substantially as described.

TAL. P. SHAFFNER.

Witnesses:
ALEXR. A. C. KLAUCKE,
EDWARD H. KNIGHT.